US012590206B2

(12) United States Patent
Katsumata et al.

(10) Patent No.: US 12,590,206 B2
(45) Date of Patent: Mar. 31, 2026

(54) METHOD OF MAKING A POROUS STRUCTURE AND POROUS STRUCTURE MADE THEREBY

(71) Applicant: UNIVERSITY OF MASSACHUSETTS, Boston, MA (US)

(72) Inventors: Reika Katsumata, Worcester, MA (US); Todd Emrick, South Deerfield, MA (US); James Nicolas Matias Pagaduan, Amherst, MA (US)

(73) Assignee: University of Massachusetts, Boston, MA (US)

( * ) Notice: Subject to any disclaimer, the term of this patent is extended or adjusted under 35 U.S.C. 154(b) by 731 days.

(21) Appl. No.: 17/969,810

(22) Filed: Oct. 20, 2022

(65) Prior Publication Data

US 2023/0159737 A1 May 25, 2023

Related U.S. Application Data

(60) Provisional application No. 63/282,378, filed on Nov. 23, 2021.

(51) Int. Cl.
| | |
|---|---|
| *C08L 25/06* | (2006.01) |
| *C08K 3/30* | (2006.01) |
| *C08L 29/10* | (2006.01) |
| *C09D 129/10* | (2006.01) |

(52) U.S. Cl.
CPC .............. *C08L 25/06* (2013.01); *C08L 29/10* (2013.01); *C09D 129/10* (2013.01); *C08K 2003/3009* (2013.01)

(58) Field of Classification Search
CPC ....... C08L 25/06; C08L 29/10; C09D 129/10; C08K 2003/3009
See application file for complete search history.

(56) References Cited

FOREIGN PATENT DOCUMENTS

CN          113120879 A  *  7/2021  ........... G01L 5/0028

OTHER PUBLICATIONS

Machine English translation of CN 113120879, Liu et al., Jul. 16, 2021.*
Arora et al., "Block Copolymer Self-Assembly-Directed Single-Crystal Homo- and Heteroepitaxial Nanostructures", Science, vol. 330, Oct. 8, 2010; pp. 214-220.
Bae et al., "Linearly and Highly Pressure-Sensitive Electronic Skin Based on a Bioinspired Hierarchical Structural Array", Advanced Materials, vol. 28, 2016; pp. 5300-5306.
Bank et al., The Influence of Solvent upon the Compatibility of Polystyrene and Poly(vinyl methyl ether), Macromolecules, vol. 4, No. 1, 1971; pp. 43-46.

Bhooshan et al., "Large-Area, Nanometer-Scale Discrete Doping of Semiconductors via Block Copolymer Self-Assembly", Advanced Materials Interfaces, vol. 2, 2015; 6 pages.
Bhooshan, P. et al., "Ordered polymer-based spin-on dopants", Proc. of SPIE, vol. 10960; 9 pages.
Bryson et al., "Using Janus Nanoparticles to Trap Polymer Blend Morphologies during Solvent-Evaporation-Induced Demixing", Macromolecules, vol. 48, 2015; pp. 4220-4227.
Cahn, J. W., "On Spinodal Decomposition", Acta Metallurgica, vol. 9, 1961; 7 pages.
Ceresoli, M. et al., "Scaling of correlation length in lamellae forming PS-b-PMMA thin films upon high temperature rapid thermal treatments", Journal of Materials Chemistry C, vol. 3, 2015; 7 pages.
Chen, T. et al., "An activity recoverable carbon nanotube based electrocatalysts: Rapid annealing effects and Importance of defects", Carbon, vol. 129, 2018; pp. 119-127.
Chiarcos, R. et al., "Thermal Degradation in Ultrathin Films Outperforms Dose Control of n-Type Polymeric Dopants for Silicon", ACS Appl. Electron. Mater., vol. 1, 2019; pp. 1807-1816.
Chuenchom, L. et al., "Recent progress in soft-templating of porous carbon materials", Soft Matter, vol. 8, 2012; pp. 10801-18012.
Farah et al., "Conductivity enhancement of poly(3,4-ethylenedioxythiophene)-poly(styrenesulfonate) films post-spincasting", Journal of Applied Physics, vol. 112, 2012; 9 pages.
Ferrarese et al., "Fine Tuning of Lithographic Masks through Thin Films of PS-b-PMMA with Different Molar Mass by Rapid Thermal Processing", ACS Applied Materials and Interfaces, vol. 6, 2014; pp. 7180-7188.
Fox, T.G., "Bulletin of the American Physical Society", Library Express, Accessed: May 6, 2021; 3 pages.
Fukumaru, T. et al., "Design and preparation of porous polybenzoxazole films using the tert-butoxycarbonyl group as a pore generator and their application for patternable low-k materials", Polymer Chemistry, vol. 3, 2012; 8 pages.
Gesser et al., "Aerogels and Related Porous Materials", Chem. Rev., vol. 89, 1988; pp. 765-788.
Hill et al., "Rapid Thermal Annealing—Theory and Practice", Reduced Thermal Processing for ULSI, 1989; pp. 143-180.
Ho et al., "Wafer-Scale, Sub-5 nm Junction Formation by Monolayer Doping and Conventional Spike Annealing", Nano Letters, vol. 9, No. 2, pp. 725-730.
Ho et al., "Controlled nanoscale doping of semiconductors via molecular monolayers", Nature Materials, vol. 7, 2008; pp. 62-67.
Hoarfrost, M. et al., "Spin-On Organic Polymer Dopants for Silicon", The Journal of Physical Chemistry Letters, vol. 4, 2013; pp. 3741-3746.
Hrubesh, L. W., "Aerogel applications", Journal of Non-Crystalline Solids, vol. 225, 1998; p. 335-342.

(Continued)

*Primary Examiner* — Patrick D Niland
(74) *Attorney, Agent, or Firm* — Stites & Harbison, PLLC

(57) ABSTRACT

A method of making a porous structure is described herein. The method includes combining a hard material comprising a carbonaceous material, an inorganic material, or a combination thereof, with a polymer blend to provide a mixture; and heating the mixture to a temperature effective to template the hard material, degrade the polymer blend and provide the porous structure comprising the hard material. Porous structures having a a solid continuous phase and a gaseous dispersed phase are also provided.

19 Claims, 9 Drawing Sheets

(56) References Cited

OTHER PUBLICATIONS

Jiang et al., "Separation-Free Polyaniline/TiO 2 3D Hydrogel with High Photocatalytic Activity", Adv. Mater. Interfaces., vol. 3, 2016; 9 pages.

Katsumata et al., "Mussel-Inspired Strategy for Stabilizing Ultrathin Polymer Films and Its Application to Spin-On Doping of Semiconductors", Chem. Mater., vol. 30, 2018; pp. 5285-5292.

Lee et al., "Tailored Assembly of Carbon Nanotubes and Graphene", Advanced Functional Materials, vol. 21, 2011; pp. 1338-1354.

Li et al., "Electrochemical Deposition: an Advanced Approach for Templated Synthesis of Nanoporous Metal Architectures", Acc. Chem. Res., vol. 51, 2018; pp. 1764-1773.

Li et al., "Ultra-thin conformal coating for spin-on doping applications", Proc. of SPIE, vol. 10960; 13 pages.

Liang et al., "Synthesis of a Large-Scale Highly Ordered Porous Carbon Film by Self-Assembly of Block Copolymers", Angew. Chem. Int. Ed., vol. 43, 2004; pp. 5785-5789.

Longo et al., "Monolayer Doping via Phosphonic Acid Grafting on Silicon: Microscopic Insight from Infrared Spectroscopy and Density Functional Theory Calculations", Advanced Functional Materials, vol. 23, 2013; pp. 3471-3477.

Lupi et al., "Rapid Thermal processing of self-assembling block copolymer thin films", Nanotechnology, vol. 24, 2013; 8 pages.

Manna et al., "Nanostructured Sulfur-Doped Porous Reduced Graphene Oxide for the Ultrasensitive Electrochemical Detection and Efficient Removal of Hg(II)", ACS Sustainable Chem. Eng., vol. 6, 2018; pp. 6175-6182.

McMaster, "Aspects of Polymer-Polymer Thermodynamics", Macromolecules, vol. 6, No. 5, 1973; pp. 760-773.

Miesch et al., "Kinetically Trapped Co-continuous Polymer Morphologies through Intraphase Gelation of Nanoparticles", NANO Letters, vol. 11, 2011; pp. 1997-2003.

Nakos et al., "The Expanding Role of Rapid Thermal Processing in CMOS Manufacturing", Materials Science Forum, vols. 573-574, 2008; pp. 3-19.

Narita, K. et al., "$D Architected Carbon Electrodes for Energy Storage", Advanced Energy Materials, vol. 11, 2021; 13 pages.

Perego et al., "Ordering dynamics in symmetric PS-b-PMMA diblock copolymer thin films during rapid thermal processing", Journal of Materials Chemistry C., vol. 2, 2014; 10 pages.

Perego, M. et al., "Control of Doping Level in Semiconductors via Self-Limited Grafting of Phosphorus End-Terminated Polymers", ACS Nano, vol. 12, 2018; pp. 178-186.

Perego, M. et al., "Doping of silicon with phosphorus end-terminated polymers: source characterization and dopant diffusion in SiO2", Journal of Material Science, vol. 9, 2021; 9 pages.

Qiang, Z. et al., "Generalized Synthesis of a Family of Highly Heteroatom-Doped Ordered Mesoporous Carbons", Chemistry of Materials, vol. 29, 2017; pp. 10178-10186.

Rutledge, S. A. et al., Carrier mobility enhancement in poly(3,4-ethylenedioxythiophene)-poly(styrenesulfonate having undergone rapid thermal annealing, Journal of Applied Physics, vol. 114, 2013; 6 pages.

Samitsu et al., "Flash freezing route to mesoporous polymer nanofibre networks", Nature Communications, 2013; 7 pages.

Samitsu, S., "Thermally Stable Mesoporous Poly(ether sulfone) Monoliths with Nanofiber Network Structures", Macromolecules vol. 51, 2018; pp. 151-160.

Schawe, J. E. K., "Influence of processing conditions on polymer crystallization measured by fast scanning DSC", J. Therm. Anal. Calorim., vol. 116, 2014; pp. 1165-1173.

Song, L. et al., "Challenges in Fabrication of Mesoporous Carbon Films with Ordered Cylindrical Pores via Phenolic Oligomer Self-Assembly with Triblock Copolymers", American Chemical Society, vol. 4, No. 1, 2010; pp. 189-198.

Su, L. et al., "Ultralight, Recoverable, and High-Temperature-Resistant SiC Nanowire Aerogel", ACS Nano, vol. 12, 2018; pp. 3103-3111.

Tan et al., "Synthesis and Formation Mechanism of All-Organic Block Copolymer-Directed Templating of Laser-Induced Crystalline Silicon Nanostructures", ACS Appl. Mater. Interfaces, vol. 10, 2018; pp. 42777-42785.

Tan et al., "Transient laser heating induced hierarchical porous structures from block copolymer-directed self-assembly", Porous Materials, vol. 349, Issue 6243; Jul. 3, 2015; 6 pages.

Tanaka, H. "Formation of Network and Cellular Structures by Viscoelastic Phase Separation", Advanced Materials, vol. 21, 2009; pp. 1872-1880.

Thommes, M. et al., "Physisorption of gases, with special reference to the evaluation of surface area and pore size distribution (IUPAC Technical Report)", Pure Appl. Chem., vol. 87, No. 9-10, 2015; pp. 1051-1069.

Tillotson, T. M. et al., "Transparent Ultralow-Density Silica Aerogels prepared by a two-step sol-gel process", Third International Symposium on Aerogels; Received by OSTI on Nov. 12, 1991; 19 pages.

Trivedi, M. et al., "Control of Pore Size in Ordered Mesoporous Carbon-Silica by Hansen Solubility Parameters of Swelling Agent", Langmuir, vol. 35, 2019; pp. 14049-14059.

* cited by examiner

Polymer Blend / rGO Composite     Porous rGO Network

Carbon Black             Carbon Nanopowder

MWCNT                 Graphene Oxide

Carbon Black             Carbon Nanopowder

MWCNT                 Graphene Oxide

MoS$_2$

METHOD OF MAKING A POROUS STRUCTURE AND POROUS STRUCTURE MADE THEREBY

CROSS REFERENCE TO RELATED APPLICATION

This application claims priority to U.S. Provisional Patent Application No. 63/282,378, filed on Nov. 23, 2021, in the United States Patent and Trademark Office, and all the benefits accruing therefrom under 35 U.S.C. § 119, the content of which is incorporated herein in its entirety by reference.

BACKGROUND

Three-dimensional (3D) porous structures with high surface area and adjustable pore size are relevant to emerging applications ranging from next-generation energy storage to aerospace engineering. See, e.g., S. J. Yeo, M. J. Oh, P. J. Yoo, Adv. Mater. 2019, 31, 1803670; X. S. Zhao, F. Su, Q. Yan, W. Guo, X. Ying Bao, L. Lv, Z. Zhou, Journal of Materials Chemistry 2006, 16, 637; L. Chuenchom, R. Kraehnert, B. M. Smarsly, Soft Matter 2012, 8, 10801; T. Zhang, R. A. Sanguramath, S. Israel, M. S. Silverstein, Macromolecules 2019, 52, 5445; M. Antonietti, Current Opinion in Colloid & Interface Science 2001, 6, 244; W.-S. Chae, P. V. Braun, Chem. Mater. 2007, 19, 5593; H. Zhang, A. I. Cooper, Soft Matter 2005, 1, 107; C. Li, M. Iqbal, J. Lin, X. Luo, B. Jiang, V. Malgras, K. C.-W. Wu, J. Kim, Y. Yamauchi, Acc. Chem. Res. 2018, 51, 1764; L. Wu, Y. Li, Z. Fu, B.-L. Su, National Science Review 2020, 7, 1667; T. A. Schaedler, A. J. Jacobsen, A. Torrents, A. E. Sorensen, J. Lian, J. R. Greer, L. Valdevit, W. B. Carter, Science 2011, 334, 962. Excellent structural control can allow for tuning the properties of porous materials, including their density, elasticity, and thermal conductivity, which combine to underpin their performance in lightweight optics, energy damping, and thermal superinsulation. See, e.g., L. W. Hrubesh, Journal of Non-Crystalline Solids 1998, 225, 335; H. D. Gesser, P. C. Goswami, Chem. Rev. 1989, 89, 765; L. Su, H. Wang, M. Niu, X. Fan, M. Ma, Z. Shi, S.-W. Guo, ACS Nano 2018, 12, 3103; Y. Yan, S. C. King, M. Li, T. Galy, M. Marszewski, J. S. Kang, L. Pilon, Y. Hu, S. H. Tolbert, J. Phys. Chem. C 2019, 123, 21721; M. Chhowalla, D. Jariwala, Science 2019, 363, 694. In particular, introducing multiscale structures, spanning from nanometers to centimeters, gives rise to notable properties, such as high tensile elasticity (see, e.g., X. Zheng, W. Smith, J. Jackson, B. Moran, H. Cui, D. Chen, J. Ye, N. Fang, N. Rodriguez, T. Weisgraber, C. M. Spadaccini, Nature Mater 2016, 15, 1100), high volumetric energy density (see, e.g., D. Yu, K. Goh, H. Wang, L. Wei, W. Jiang, Q. Zhang, L. Dai, Y. Chen, Nature Nanotech 2014, 9, 555), and high sensitivity (see, e.g., G. Y. Bae, S. W. Pak, D. Kim, G. Lee, D. H. Kim, Y. Chung, K. Cho, Advanced Materials 2016, 28, 5300), not seen in bulk-scale materials for structural, supercapacitor, and sensing applications. However, these multiscale architectures are often constrained by manufacturing scalability, making desirable properties inaccessible in real-world applications. For instance, only a limited selection of polymerizable precursors that undergo stepwise self-assembly and high-temperature carbonization are useful for bottom-up synthesis of porous networks with high carbon yield. See, e.g., C. Liang, K. Hong, G. A. Guiochon, J. W. Mays, S. Dai, Angewandte Chemie International Edition 2004, 43, 5785.

Despite examples of templating and template-free approaches to three-dimensional porous structures, there remains a need to devise easy, scalable strategies for preparing porous hard materials.

SUMMARY

A method of making a porous structure comprises combining a hard material comprising a carbonaceous material, an inorganic material, or a combination thereof, with a polymer blend to provide a mixture; and heating the mixture to a temperature effective to template the hard material, degrade the polymer blend and provide the porous structure comprising the hard material.

A porous structure made by the method represents another aspect of the present disclosure.

A porous structure comprises a solid continuous phase, and a gaseous dispersed phase, wherein the solid continuous phase comprises a hard material comprising a carbonaceous material, an inorganic material, or a combination thereof; wherein the porous structure comprises mesopores having an average diameter of 2 to 50 nanometers and macropores having an average diameter of greater than 50 nanometers; wherein the porous structure has a macropore area of greater than 10%, or 15 to 50%, or 20 to 50%; and optionally, wherein the porous structure has one or both of: an average pore volume of 0.5 to 1.5 $cm^3$/g, or 0.75 to 1.2 $cm^3$/g, or 0.85 to 1.15 $cm^3$/g, and a specific surface area of greater than 75 $m^2$/g, or greater than 100 $m^2$/g, or greater than 150 $m^2$/g.

The above described and other features are exemplified by the following figures and detailed description.

BRIEF DESCRIPTION OF THE DRAWINGS

The following figures represent exemplary embodiments.

at ramp rates of 68° C./s (top two rows) and 37° C./s (bottom two rows). Scale bars represent 50 μm.

Figure 8:
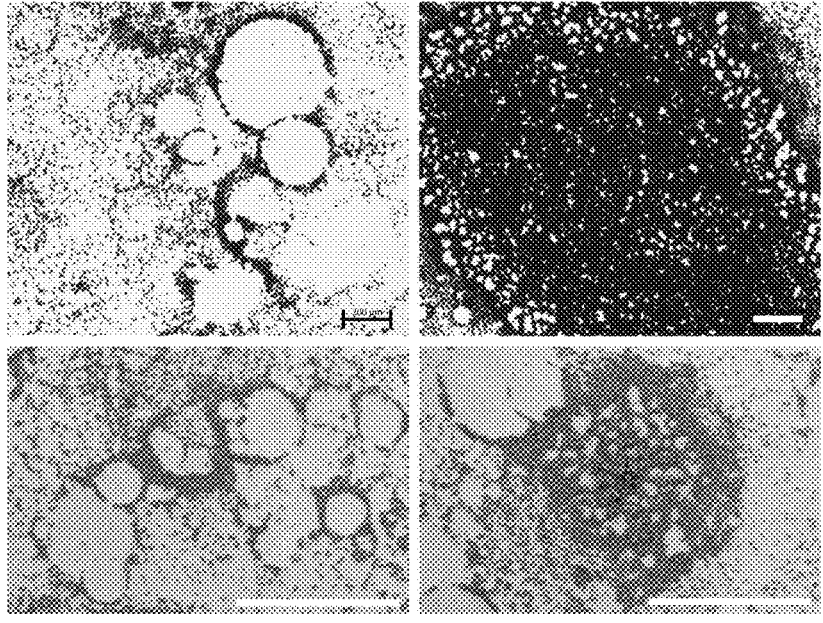

FIG. 8 shows optical (top row) and SEM (bottom row) images of rGO at different regions after RTA (68° C./s) at 600° C. of PS/PVME/rGO (1 wt % filler loading). Scale bars for the optical images (top row) are 200 μm. Scale bars for the SEM images (bottom row) are 500 μm.

Figure 9:
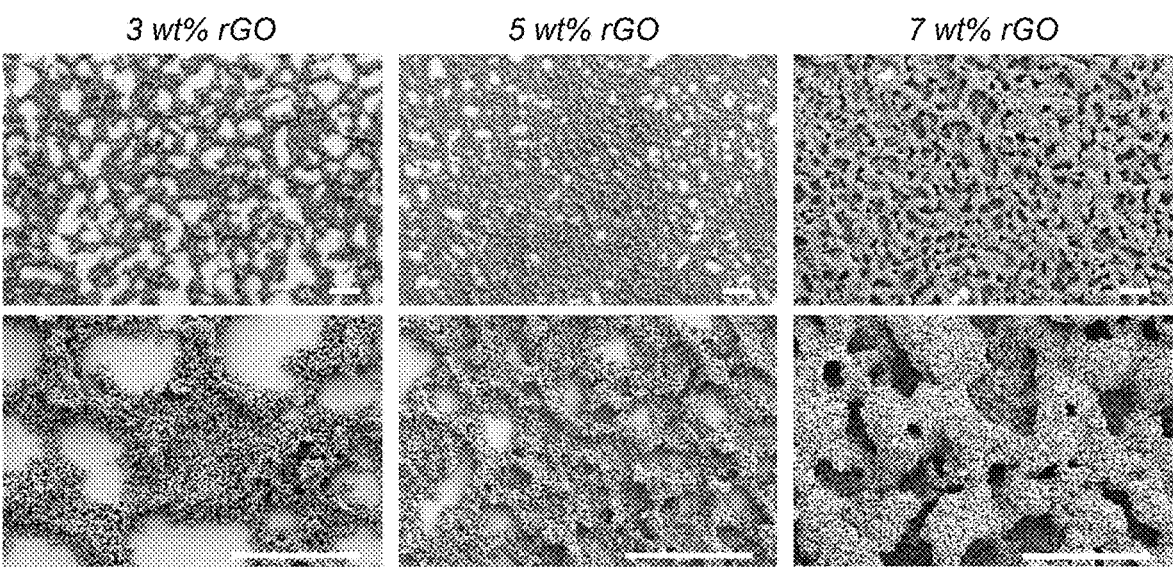

FIG. 9 shows SEM images of rGO after RTA (68° C./s) at 600° C. of PS/PVME/rGO with varying filler loading (3, 5, and 7 wt %) at a magnification of 120× (top) and 500× (bottom). Scale bars represent 100 μm.

Figure 10:
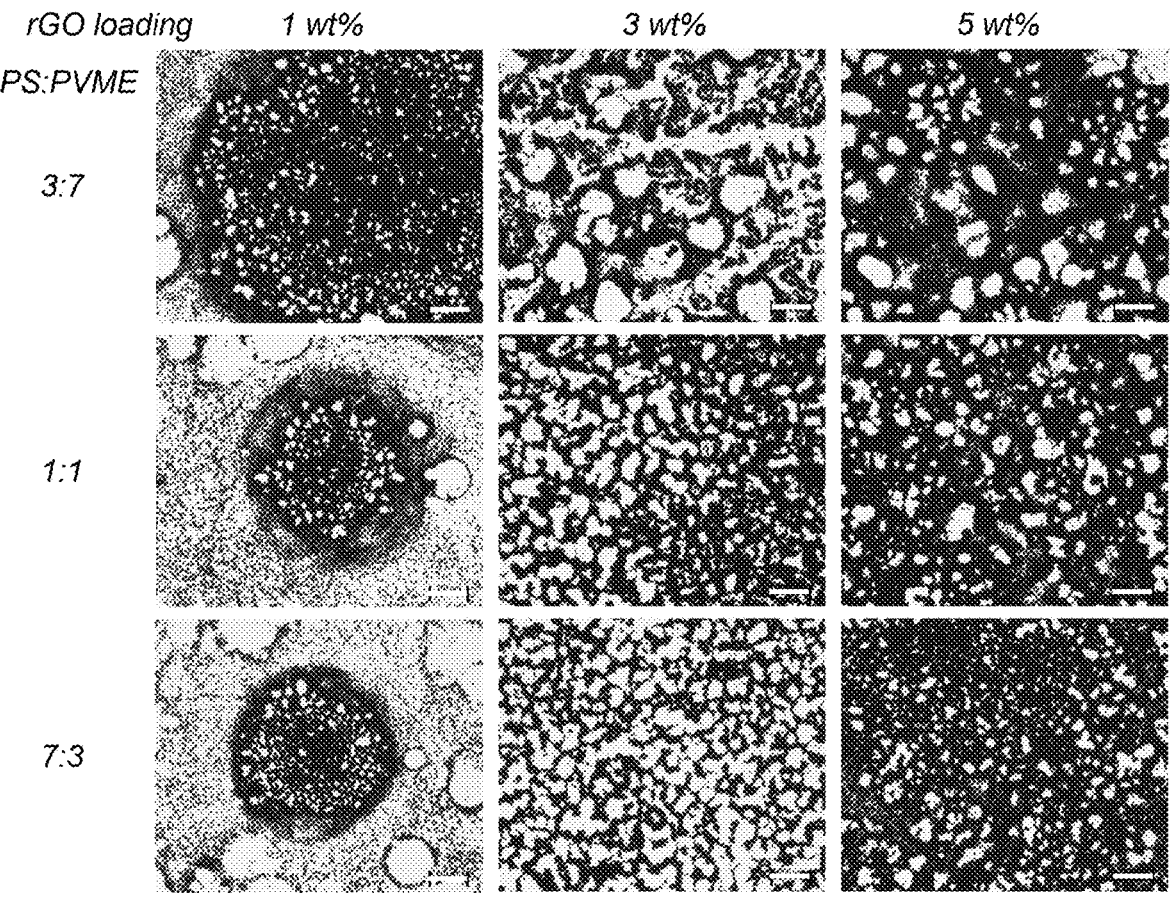

FIG. 10 shows optical images of rGO after RTA (37° C./s) at 600° C. of PS/PVME/rGO with varying filler loading (3, 5, and 7 wt %) and PS:PVME ratio (3:7, 1:1, and 7:3). Scale bars represent 200 μm.

Figure 11:
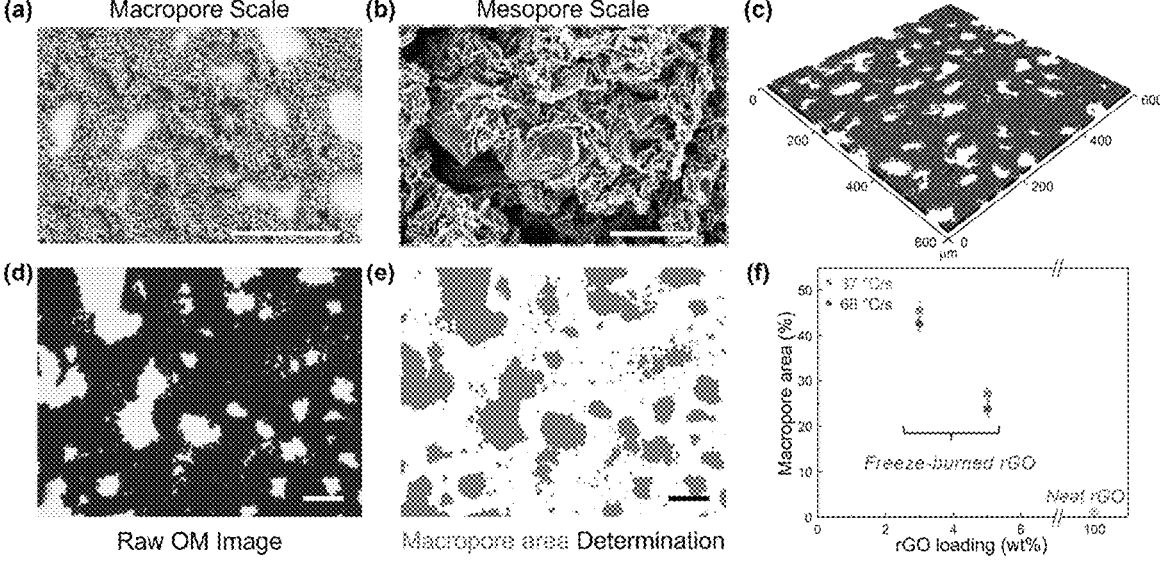

FIG. 11 shows SEM images of freeze-burned rGO (5 wt % loading) after RTA (68° C./s) to 600° C., highlighting its (a) macroporous and (b) mesoporous nature; (c) corresponding 3D structure of freeze-burned rGO (thickness=9.3 μm) from laser confocal microscopy; (d) raw and (e) processed optical images of freeze-burned rGO for macropore area (shaded region) determination via image analysis; and (f) plot of % macropore area as a function of rGO loading. Error bars indicate the standard error of calculated values from at least 10 images. Scale bars: (a) 100 μm, (b) 2 μm, (d) 50 μm, and (e) 50 μm.

Figure 12:
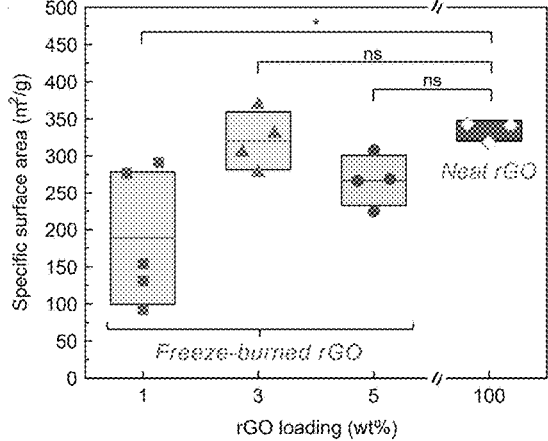

FIG. 12 shows specific surface area (m²/g) versus rGO loading (wt %) calculated via BET method. Boxes with midlines indicate the mean±S.D. obtained from measurement of 3 to 5 samples represented by each data point; ns means no significant difference (p<0.01) as evaluated by one-way ANOVA followed by Tukey's post-test.

Figure 13:
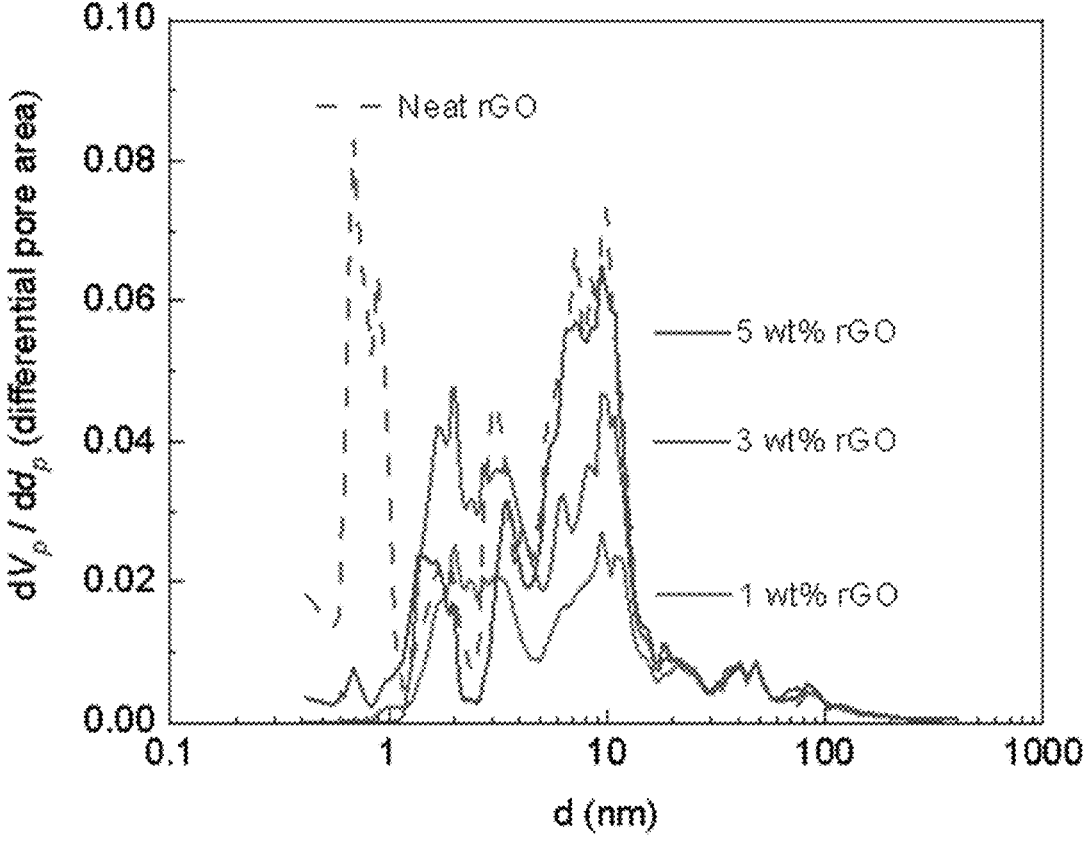

FIG. 13 shows differential pore size distributions (obtained via GCMC method) from nitrogen gas adsorption measurements of freeze-burned (1, 3, and 5 wt % loading) and neat rGO.

Figure 14:
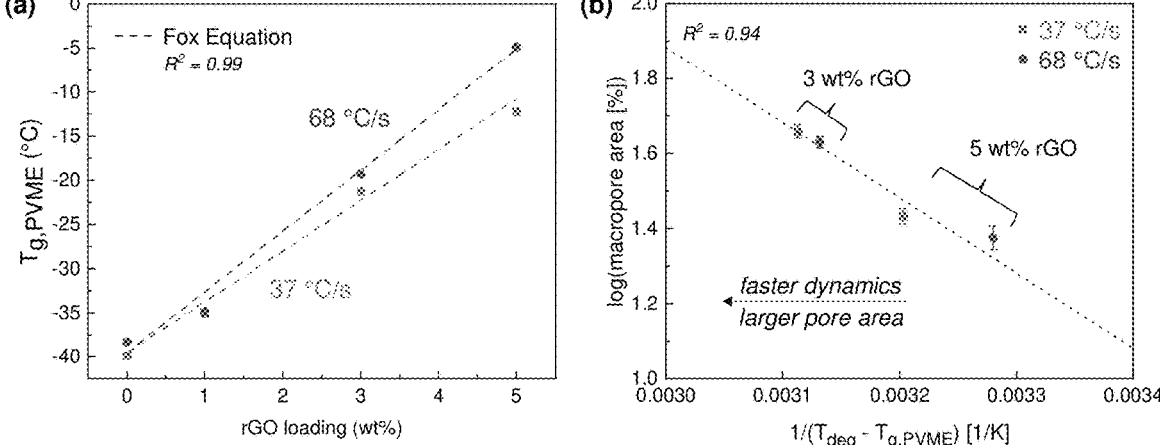

FIG. 14 shows (a) $T_{g,PVME}$ at RTA ramp rates of 37 and 68° C./s extrapolated from DSC measurements of PS/PVME filled with varying rGO concentration. Dashed lines are fitted to the Fox equation assuming a two-component system of PVME and rGO; and (b) semi-logarithmic plot of percent macropore area (obtained from image analysis) against the reciprocal of $T_{deg}-T_{g,PVME}$ (where $T_{deg}$ is 300° C., the onset of PVME degradation from TGA), revealing the inverse relationship between macropore area and $T_{g,PVME}$. Error bars indicate the standard error of calculated values from at least 10 images.

Figure 15:
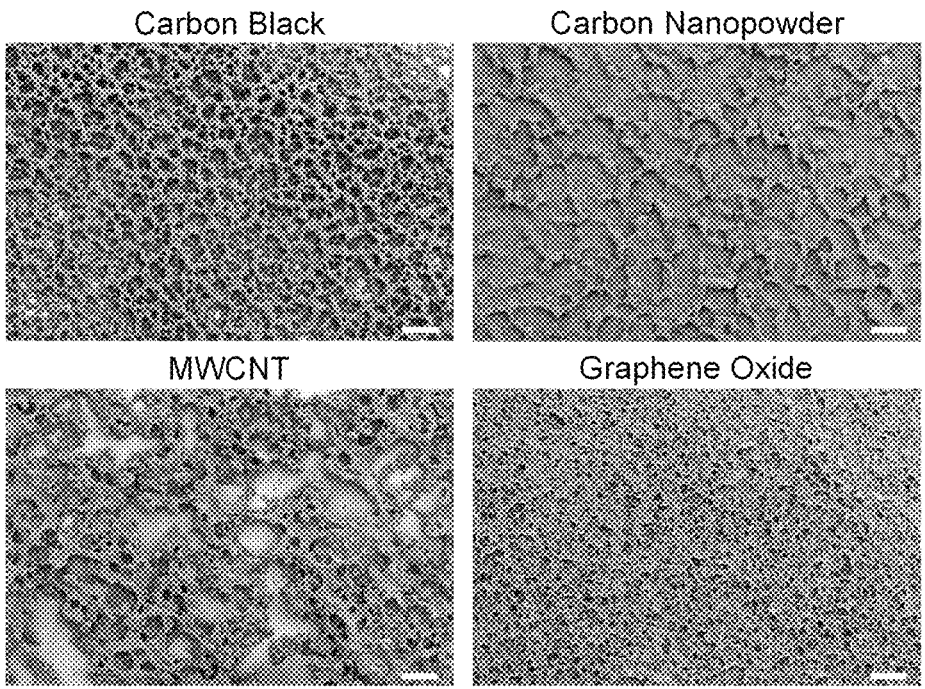

FIG. 15 shows SEM micrographs of carbon black, multi-walled carbon nanotube (MWCNT), and graphene oxide after RTA (68° C./s) to 600° C. of PS/PVME loaded with 5 wt % of corresponding fillers. Scale bars represent 100 μm.

Figure 16:
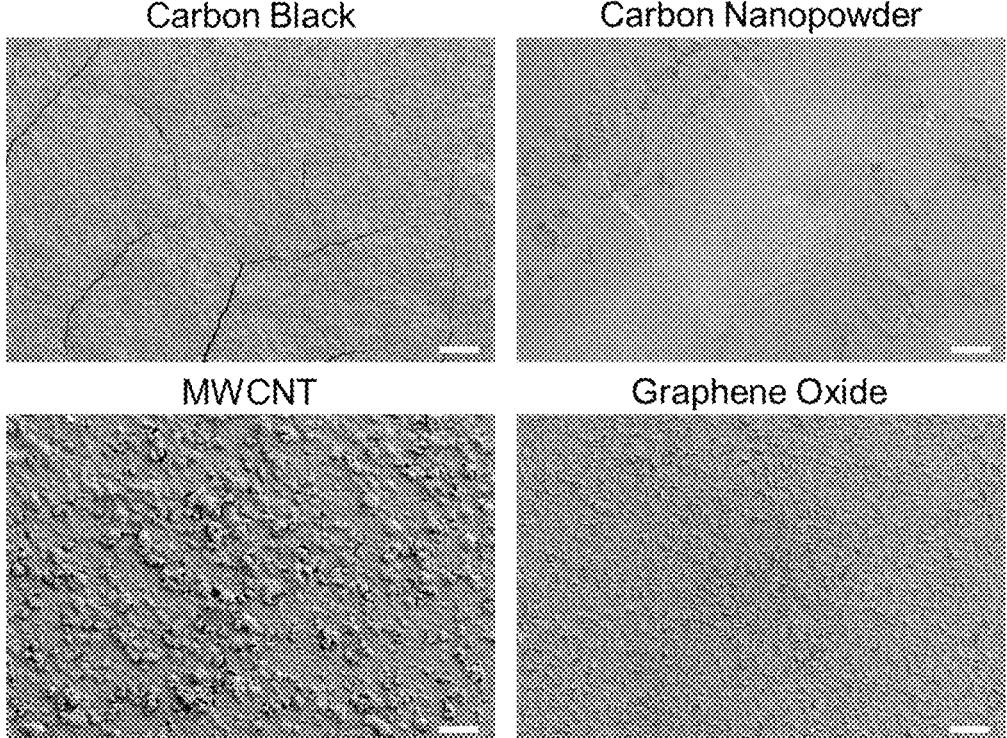

FIG. 16 shows SEM images of as-cast neat carbon black, carbon nanopowder, multi-walled carbon nanotube (MWCNT), and graphene oxide. Scale bars represent 100 μm.

Figure 17:
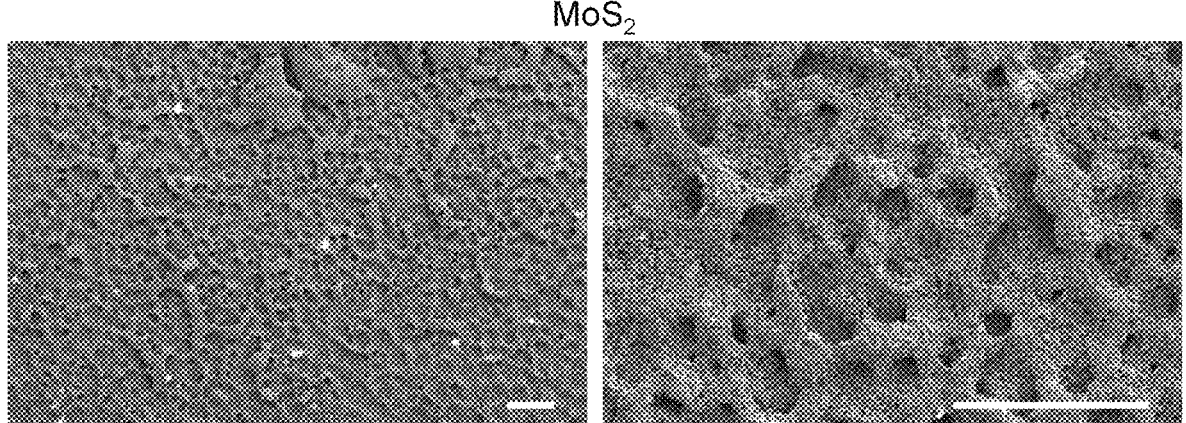

FIG. 17 shows SEM images of freeze-burned networks of molybdenum disulfide at 120× (left) and 500× (right) magnification. Scale bars represent 100 μm.

DETAILED DESCRIPTION

Top-down approaches to fabricating porous networks from hard materials (e.g., carbon-based porous materials) are typically faced with difficulties in controlling orientation and spatial distribution of target materials, for example, especially those involving the chemically inert graphene and carbon nanotubes that readily stack and bundle. See, e.g., S.

H. Lee, D. H. Lee, W. J. Lee, S. O. Kim, Advanced Functional Materials 2011, 21, 1338. The trade-off between structural control and simplicity of fabrication for producing porous materials presents an outstanding challenge for researchers. Porous structures may be fabricated with a degradable template that directs the assembly of organic and inorganic materials into forms that are otherwise challenging to achieve in a well-controlled manner A wide range of hierarchically porous materials, including carbon-rich structures (Y. Gu, H. Wu, Z. Xiong, W. A. Abdulla, X. S. Zhao, Journal of Materials Chemistry A 2014, 2, 451; B. Yu, D. Kuang, S. Liu, C. Liu, T. Zhang, Sensors and Actuators B: Chemical 2014, 205, 120; X. Yu, L. Feng, H. S. Park, Journal of Power Sources 2018, 390, 93; D. Zhou, W.-L. Song, X. Li, L.-Z. Fan, Electrochimica Acta 2016, 207, 9; B. Manna, C. R. Raj, ACS Sustainable Chem. Eng. 2018, 6, 6175), silicon (K. W. Tan, B. Jung, J. G. Werner, E. R. Rhoades, M. O. Thompson, U. Wiesner, Science 2015, 349, 54; K. W. Tan, J. G. Werner, M. D. Goodman, H. S. Kim, B Jung, H. Sai, P. V. Braun, M. 0. Thompson, U. Wiesner, ACS Appl. Mater. Interfaces 2018, 10, 42777; F. Yu, Q. Zhang, R. P. Thedford, A. Singer, D.-M. Smilgies, M. O. Thompson, U. B. Wiesner, ACS Nano 2020, 14, 11273), and metallic structures (H. Arora, P. Du, K. W. Tan, J. K. Hyun, J. Grazul, H. L. Xin, D. A. Muller, M. O. Thompson, U. Wiesner, Science 2010, 330, 214), have been fabricated by templating methods. However, cumbersome processing steps are often required in these techniques to fabricate and/or remove the template and backfill it with desired materials. On the other hand, template-free approaches, such as sol-gel method and freeze-drying of hydrogels, have immense potential for scalability; yet they do not offer fine structural control, limiting the range of attainable properties. See, e.g., T. M. Tillotson, L. W. Hrubesh, Journal of Non-Crystalline Solids 1992, 145, 44; K. Zhou, R. Gao, Z. Gui, Y. Hu, Composites Part A: Applied Science and Manufacturing 2017, 94, 1; W. Jiang, Y. Liu, J. Wang, M. Zhang, W. Luo, Y. Zhu, Advanced Materials Interfaces 2016, 3, 1500502; M. A. Worsley, P. J. Pauzauskie, T. Y. Olson, J. Biener, J. H. Satcher, T. F. Baumann, J. Am. Chem. Soc. 2010, 132, 14067; M. A. Worsley, S. J. Shin, M. D. Merrill, J. Lenhardt, A. J. Nelson, L. Y. Woo, A. E. Gash, T. F. Baumann, C. A. Orme, ACS Nano 2015, 9, 4698; R. Zhang, W. Wan, L. Qiu, Y. Zhou, Materials Letters 2016, 181, 321; L. Yang, A. Mukhopadhyay, Y. Jiao, Q. Yong, L. Chen, Y. Xing, J. Hamel, H. Zhu, Nanoscale 2017, 9, 11452. 3D printing, a template-free technique that affords precise control over structure, requires multiple steps to obtain the final product, thus reducing throughput. See, e.g., Q. Zhang, X. Xu, D. Lin, W. Chen, G. Xiong, Y. Yu, T. S. Fisher, H. Li, Advanced Materials 2016, 28, 2229; X. Xu, Q. Zhang, Y. Yu, W. Chen, H. Hu, H. Li, Advanced Materials 2016, 28, 9223; K. Narita, M. A. Citrin, H. Yang, X. Xia, J. R. Greer, Advanced Energy Materials 2021, 11, 2002637. Overall, despite the numerous examples of templating and template-free approaches, there remains a need to devise easy, scalable strategies for preparing porous hard materials.

To address these challenges, rapid thermal annealing (RTA) may be exploited for simple, high-throughput fabrication of porous structures with minimized thermal budget, i.e., area under the time-temperature curve. During RTA, samples are heated at an extremely rapid rate, up to 150° C./s, to over 1000° C. in a controlled atmosphere (e.g., $N_{2(g)}$), typically with high-intensity infrared lamps. See, e.g., C. Hill, S. Jones, D. Boys, in Reduced Thermal Processing for ULSI (Ed.: R. A. Levy), Springer US, Boston, MA, 1989, pp. 143-180. Such exceptional heat control has elevated RTA into an established process in the semiconductor industry for doping and lattice damage repair. See, e.g., J. Nakos, J. Shepard, Materials Science Forum 2008, 573-574, 3. In contrast to the extensive application of RTA on semiconductors, only a few investigations involving polymers have been reported. Inspired by spin-on doping with small-molecule self-assembled monolayers (J. C. Ho, R. Yerushalmi, Z. A. Jacobson, Z. Fan, R. L. Alley, A. Javey, Nature Mater 2008, 7, 62; R. C. Longo, K. Cho, W. G. Schmidt, Y. J. Chabal, P. Thissen, Advanced Functional Materials 2013, 23, 3471; J. C. Ho, R. Yerushalmi, G. Smith, P. Majhi, J. Bennett, J. Halim, V. N. Faifer, A. Javey, Nano Lett. 2009, 9, 725), researchers have fabricated ultrashallow doped silicon by RTA-induced rapid diffusion and degradation of dopant-containing polymers. See, e.g., M. L. Hoarfrost, K. Takei, V. Ho, A. Heitsch, P. Trefonas, A. Javey, R. A. Segalman, J. Phys. Chem. Lett. 2013, 4, 3741; B. C. Popere, B. Russ, A. T. Heitsch, P. Trefonas, R. A. Segalman, Advanced Materials Interfaces 2015, 2, 1500421; R. Katsumata, R. Limary, Y. Zhang, B. C. Popere, A. T. Heitsch, M. Li, P. Trefonas, R. A. Segalman, Chem. Mater. 2018, 30, 5285; B. C. Popere, P. Trefonas, A. T. Heitsch, M. Li, R. Limary, M. L. Hoarfrost, K. Takei, V. Ho, A. Javey, Y. Zhang, R. Katsumata, R. A. Segalman, in Advances in Patterning Materials and Processes XXXVI, International Society For Optics And Photonics, 2019, p. 1096023; M. Li, B. Popere, P. Trefonas, A. T. Heitsch, R. Limary, R. Katsumata, Y. Zhang, R. A. Segalman, in Advances in Patterning Materials and Processes XXXVI, International Society For Optics And Photonics, 2019, p. 109600R; H. Wu, B. Guan, Y. Sun, Y. Zhu, Y. Dan, Sci Rep 2017, 7, 41299; M. Perego, G. Seguini, E. Mascheroni, E. Arduca, V. Gianotti, M. Laus, J. Mater. Chem. C 2021, 9, 4020; R. Chiarcos, V. Gianotti, M. Cossi, A. Zoccante, D. Antonioli, K. Sparnacci, M. Laus, F. E. Caligiore, M. Perego, ACS Appl. Electron. Mater. 2019, 1, 1807; M. Perego, G. Seguini, E. Arduca, A. Nomellini, K. Sparnacci, D. Antonioli, V. Gianotti, M. Laus, ACS Nano 2018, 12, 178. Other studies include enhancement of the charge carrier mobility of organic semiconductors (S. A. Rutledge, A. S. Helmy, Journal of Applied Physics 2013, 114, 133708; A. A. Farah, S. A. Rutledge, A. Schaarschmidt, R. Lai, J. P. Freedman, A. S. Helmy, Journal of Applied Physics 2012, 112, 113709) and rapid ordering of block copolymers (F. F. Lupi, T. J. Giammaria, M. Ceresoli, G. Seguini, K. Sparnacci, D. Antonioli, V. Gianotti, M. Laus, M. Perego, Nanotechnology 2013, 24, 315601; M. Perego, F. F. Lupi, M. Ceresoli, T. J. Giammaria, G. Seguini, E. Enrico, L. Boarino, D. Antonioli, V. Gianotti, K. Sparnacci, M. Laus, J. Mater. Chem. C 2014, 2, 6655; F. Ferrarese Lupi, T. J. Giammaria, G. Seguini, F. Vita, O. Francescangeli, K. Sparnacci, D. Antonioli, V. Gianotti, M. Laus, M. Perego, ACS Appl. Mater. Interfaces 2014, 6, 7180; M. Ceresoli, F. G. Volpe, G. Seguini, D. Antonioli, V. Gianotti, K. Sparnacci, M. Laus, M. Perego, J. Mater. Chem. C 2015, 3, 8618) by leveraging non-equilibrium states that are not accessible by conventional annealing with low heating rate. Overall, however, RTA has not been utilized for rapid templating of hard materials.

Figure 1:
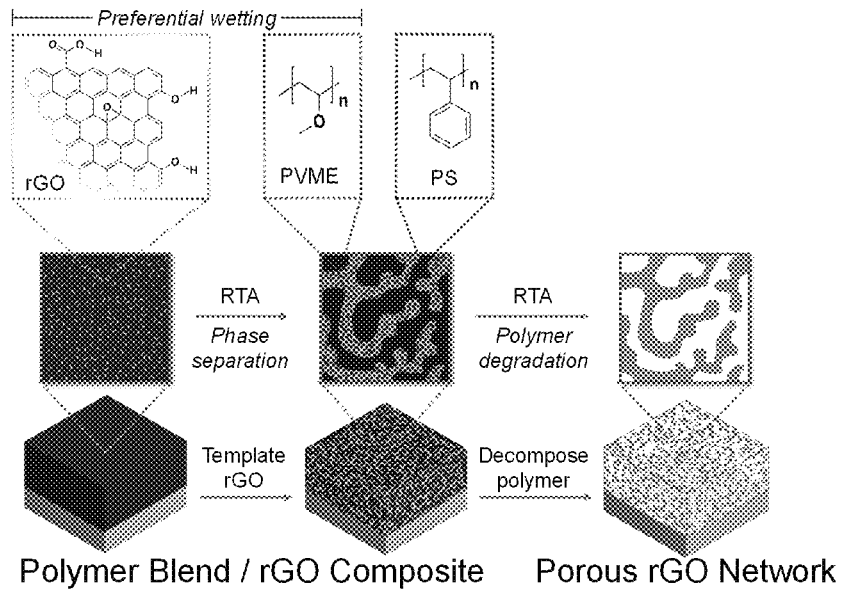
FIG. 1 is a schematic illustration of the "freeze-burn" process employing reduced graphene oxide (rGO) as a model material templated by polystyrene/poly(vinyl methyl ether) (PS/PVME). The soft template undergoes two thermal transitions: phase separation (templating) and polymer degradation (template removal).

The present inventors have discovered a new polymer-assisted RTA method, termed "freeze-burn" to highlight its similarities and differences from the well-known freeze-drying method. While freeze-drying instantaneously freezes a structure by rapid cooling and subsequent solvent removal (see, e.g., G.-W. Oetjen, P. Haseley, Freeze-Drying, John Wiley & Sons, 2004), freeze-burning fixes a structure by rapid heating and instantaneous polymer template degradation. As shown in FIG. 1, the system is designed to template hard materials (e.g., carbonaceous materials or inorganic materials) using a polymer blend, and immediately burn the polymer regions away in a single step, leaving a templated network structure comprising the hard material. Without wishing to be bound by theory, it is hypothesized that rapid heating prevents or minimizes molecular rearrangement after phase separation and before polymer degradation, thereby effectively fixing a porous structure.

To achieve porous networks (e.g., porous carbon networks or porous inorganic networks) by freeze-burn, the templating polymer blend should undergo phase separation upon heating. Such polymer blends possess a lower critical solution temperature (LCST), above which the blend miscibility decreases and phase separation becomes favorable. Depending on the composition and temperature, they can develop a droplet-matrix morphology via nucleation and growth under most conditions or form a network structure via spinodal decomposition but under a narrower processing window. See, e.g., J. W. Cahn, Acta Metallurgica 1961, 9, 795.

The present inventors have utilized RTA to fabricate porous network structures templated by a degradable polymer blend and established design rules for controlling the final network morphology. It has been discovered that polymer mobility can dictate the resultant kinetically trapped polymer/rGO morphologies, which after polymer degradation produces a percolated architecture of pristine rGO with tunable meso- and macropore size distribution while maintaining a high specific surface area (e.g., above 150 m$^2$/g). The present inventors have further demonstrated the potential universality of the freeze-burn method for carbon- or inorganic-based materials by successful fabrication of carbon-based materials, including carbon black, carbon nanopowder, multi-walled carbon nanotube (MWCNT), and graphene oxide (GO) network structures, as well as inorganic materials, including molybdenum disulfide (MoS$_2$) network structures. The method described herein advantageously avoids processing steps including long thermal treatments, etching, and freeze-drying. A significant advantage is therefore provided by the present disclosure.

Accordingly, a method of making a porous structure represents an aspect of the present disclosure. The method comprises combining a hard material with a polymer blend to provide a mixture. The mixture is then heated to a temperature effective to template the hard material, degrade the polymer blend and provide the porous structure comprising the hard material. The porous structures can also be referred to as aerogels or microporous solids having a gaseous dispersed phase (e.g., air) and a solid continuous phase.

The hard material can comprise a carbonaceous material, an inorganic material, or a combination thereof. The hard material has a degradation temperature that exceeds the degradation temperature of the polymer blend.

In an aspect, the hard material comprises the carbonaceous material. Exemplary carbonaceous materials can include, but are not limited to, carbon black, carbon fibers, carbon nanotubes (including multi-walled and single-walled carbon nanotubes), graphite, graphene, graphene oxide, reduced graphene oxide, fullerene, carbon nanopowder, carbon nanorods, graphitic structures, and the like, functionalized derivatives thereof, or a combination thereof. In an aspect, the carbonaceous material can comprise reduced graphene oxide, graphene oxide, carbon black, carbon nanopowder, carbon nanotubes, or a combination thereof. In a specific aspect, the carbonaceous material can comprise reduced graphene oxide.

In an aspect, the hard material can comprise an inorganic material. Exemplary inorganic materials can include, but are not limited to, metal nanoparticles, metal oxide nanoparticles (e.g., iron oxide, zinc oxide, copper oxide, titanium oxide, and the like, or a combination thereof), metal chalcogenide nanoparticles (e.g., a metal sulfide nanoparticle), metal dichalcogenide nanoparticles (e.g., a metal disulfide nanoparticle, such as molybdenum disulfide and the like), metal nitride nanoparticles (e.g., boron nitride, silicon nitride, and the like, or a combination thereof), metal carbide nanoparticles (e.g., silicon carbide, and the like), metallic glasses (e.g., palladium-nickel-phosphorus nanoparticles, and the like), and the like, or a combination thereof. Use of metal chalcogenide nanoparticles such as molybdenum disulfide is mentioned.

The polymer blend can comprise two or more polymers. In an aspect, the polymer blend comprises a first polymer and a second polymer. The polymer blend can exhibit phase separation between the first polymer and the second polymer at at least one temperature in the range of 25 to 500° C. Stated another way, the polymer blend can exhibit a lower critical solution temperature (LCST) in the range of 25 to 500° C. Below the lower critical solution temperature of the polymer blend, the polymers of the blend are miscible, with essentially no detectable phase separation. Above the lower critical solution temperature of the polymer blend, the polymers of the blend are immiscible and will therefore phase separate. "Miscible" as used herein refers to the blend of two or more polymers exhibiting single-phase behavior for the glass transition temperature (Tg). Stated another way, the Tg would exist as a single, sharp transition temperature (e.g., using differential scanning calorimetry). By contrast, two separate transition temperatures would be observed for an immiscible blend of two polymers, typically corresponding to the temperatures for each of the individual components of the blend. A miscible blend can be considered homogeneous, while an immiscible blend can be considered heterogeneous.

Within the aforementioned temperature range, the polymer blend can exhibit phase separation at a temperature of greater than 100° C., or greater than 200° C. Also within this range, the polymer blend can exhibit phase separation at a temperature of less than 400° C., or less than 300° C. For example, the polymer blend can exhibit phase separation at a temperature of 100 to 300° C.

Any polymer blend can be used provided that the blend exhibits the desired phase separation behavior and degradation in response to a thermal stimulus as described above. Suitable polymer blends can be determined by the skilled person without undue experimentation using the guidance provided by the present disclosure. In an aspect, the polymer blend can comprise a polystyrene, a poly(vinyl $C_{1-6}$ alkyl ether) (e.g., a poly(vinyl methyl ether)), a poly($C_{1-6}$ alkyl (meth)acrylate) (e.g., a poly(methyl methacrylate)), an alkenyl aromatic-vinyl copolymer (e.g., a styrene-acrylonitrile copolymer and the like), an acrylonitrile-conjugated diene copolymer (e.g., an acrylonitrile-butadiene copolymer, and the like), and the like, or a combination thereof. For example, the polymer blend can comprise a polystyrene, poly(vinyl methyl ether), poly(methyl methacrylate), a styrene-acrylonitrile copolymer, an acrylonitrile-butadiene copolymer, or a combination thereof.

In an aspect, the polymer blend can comprise polystyrene, for example polystyrene having a weight average molecular weight of greater than 100,000 grams/mole (g/mol), or 100,000 to 400,000 g/mol, or 100,000 to 350,000 g/mol, or 100,000 to 300,000 g/mol, or 125,000 to 250,000 g/mol.

Weight average molecular weight can be determined by gel permeation chromatography relative to polystyrene standards. In an aspect, the polymer blend can comprise poly (vinyl methyl ether), for example poly(vinyl methyl ether) having a weight average molecular weight of 50,000 to 150,000 g/mol, or 75,000 to 125,000 g/mol, or 80,000 to 100,000 g/mol.

In an aspect, the polymer blend can comprise polystyrene and poly(vinyl methyl ether). In an aspect, the polymer blend can comprise poly(methyl methacrylate) and a styrene-acrylonitrile copolymer. In an aspect, the polymer blend can comprise a styrene-acrylonitrile copolymer and an acrylonitrile-butadiene copolymer.

A first polymer and a second polymer can be present in the polymer blend in a weight ratio of 1:9 to 9:1, or 2:8 to 8:2, or 3:7 to 7:3, or 4:6 to 6:4, or 4.5:5.5 to 5.5:4.5, or 5:5.

The morphology of the polymer blend upon phase separation can depend on the relative amount of the individual polymer phases of the polymer blend. The morphology of the phase-separated polymer blend can dictate the morphology of the resulting porous structure, as further shown in the working examples below. Thus the relative ratio of the polymers in the blend can be selected to provide a desired phase-separated morphology. In an aspect, the ratio of the polymer phases of the polymer blend can be selected such that the resulting phase-separated polymer blend exhibits a co-continuous dual phase morphology. In an aspect, the hard material can preferentially wet one polymer phase to provide a co-continuous dual phase morphology wherein one phase comprises a majority of the hard material (e.g., at least 75%, or at least 80%, or at least 90%, or at least 95%, or at least 98%, or at least 99% of the hard material, based on the total weight of the hard material present in the polymer blend). Phase separation of the polymer blend can be characterized, for example, using scanning electron microscopy (SEM) or atomic force microscopy (AFM).

The hard material can be present in the mixture in an amount of greater than 0 to 10 weight percent, based on the total weight of the hard material and the polymer blend. Within this range, the hard material can be present in the mixture in an amount of greater than 0 to 7 weight percent, or greater than 0 to 6 weight percent, or 1 to 6 weight percent, or 2 to 5 weight percent, or 1 to 10 weight percent, or 3 to 10 weight percent, or 3 to 8 weight percent, or 3 to 7 weight percent, or 4 to 10 weight percent, or 5 to 10 weight percent, each based on the total weight of the hard material and the polymer blend.

The polymer blend can be present in the mixture in an amount of 90 to less than 100 weight percent, based on the total weight of the hard material and the polymer blend. Within this range, the polymer blend can be present in the mixture in an amount of 93 to less than 100 weight percent, or 94 to less than 100 weight percent, or 94 to 99 weight percent, or 95 to 98 weight percent, each based on the total weight of the hard material and the polymer blend.

The hard material is combined with the polymer blend. In an aspect, the hard material can be combined with the polymer blend by forming a solution or suspension comprising the polymer blend, the hard material, and a solvent. The solvent can generally be any organic solvent capable of dissolving the polymer blend and dispersing the hard material. A suitable solvent can be selected with the guidance of the present disclosure and without undue experimentation based on the identity of the polymer blend and the hard material. For example, the solvent can comprise tetrahydrofuran. The solution or suspension can be deposited on a suitable substrate and the solvent can be removed from the deposited mixture. Any suitable solution or suspension-based deposition or coating techniques can be used, for example, drop-casting, spin-coating, solution casting, doctor blading, and the like. The solvent can be removed by treating the sample under conditions effective to remove the solvent (e.g., at a temperature and pressure and for a time sufficient to evaporate the solvent). Conditions effective to remove the solvent can be determined without undue experimentation by the skilled person guided by the present disclosure.

The mixture comprising the hard material and the polymer blend is heated to a temperature effective to phase separate and subsequently degrade the polymer blend. In an aspect, the temperature effective to degrade the polymer blend is greater than 250° C., or greater than 300° C., or 250 to 1000° C., or 300 to 750° C., or 300 to 650° C. In an aspect, the mixture can be maintained at the temperature effective to degrade the polymer blend for a time sufficient for the polymer blend to degrade. For example, the mixture can be maintained at the degradation temperature for 30 seconds to 5 minutes, or 30 seconds to 2 minutes, or 45 seconds to 1.5 minutes.

In an aspect, heating the mixture can be at a rate of 20 to 150° C./s, or 20 to 100° C./s, or 20 to 80° C./s, or 30 to 70° C./s, or 35 to 65° C./s. Heating rates of less than 20° C./s can result in undesirable aggregated structures due to long annealing times. The rapid heating rates disclosed herein can facilitate kinetic trapping of the desired porous structures while minimizing processing time.

Heating the mixture to the temperature effective to degrade the polymer blend results in degradation and removal of the polymer blend, leaving behind a porous structure comprising the hard material, which has been templated by the phase-separated polymer blend. The porous structure comprises less than 1 weight percent of the polymer blend, or less than 0.1 weight percent of the polymer blend. Preferably the porous structure is devoid of the polymer blend. Preferably, the porous structure is co-continuous. As used herein, "co-continuous" refers to structures wherein the hard material forms a first phase, and the open pores form the second phase, the two phases intertwining in such a way that both phases remain continuous throughout the porous structure.

The porous structure can comprise a mixture of mesopores and macropores. Mesopores as used herein refer to pores having an average diameter of 2 to 50 nanometers. Macropores as used herein refer to pores having an average diameter of greater than 50 nanometers. In an aspect, the porous structure can have a macropore area of greater than 10%, for example 15 to 50%, or 20 to 50%. In an aspect, the porous structure can have an average pore volume of 0.5 to 1.5 cm³/g, or 0.75 to 1.2 cm³/g, or 0.85 to 1.15 cm³/g. In an aspect, the porous structure can have a specific surface area of greater than 75 m²/g, or greater than 100 m²/g, or greater than 150 m²/g.

Porous materials continue to establish important roles in applications extending from greenhouse gas capture to thermal superinsulation. Their effective structural control made possible by an array of templating and template-free fabrication approaches imparts remarkable properties that are otherwise unattainable in bulk materials. In the present disclosure, a "freeze-burn" process has been introduced as a versatile, rapid strategy involving polymer-templated rapid thermal annealing to fabricate porous networks of carbon, including reduced graphene oxide (rGO), graphene oxide, carbon black, carbon nanopowder, and multi-walled carbon nanotubes, without changing the template composition. The present inventors have found that macropores can be generated on the scale of phase separation without adversely affecting the mesoporous structure, and that polymer mobility can have an impact on resulting morphologies. Sequential templating and template degradation can be completed in one step, making freeze-burn an energy- and time-efficient procedure. The present disclosure provides a platform for the rapid templating of hard materials and creation of porous structures. A substantial improvement is therefore provided by the present disclosure.

This disclosure is further illustrated by the following examples, which are non-limiting.

EXAMPLES

Example 1: Reduced Graphene Oxide

Polystyrene/poly(vinyl methyl ether) (PS/PVME) and reduced graphene oxide (rGO) were used in the freeze-burn process to create porous carbon-based networks. The polymer blend, PS/PVME, was chosen due to its room-temperature solution miscibility, LCST behavior that gives access to co-continuous structures upon annealing, and preferential interaction of PVME with rGO. It is noted that the mechanical properties of the templating polymers are irrelevant because they will be degraded at the end of the freeze-burn process. rGO was selected as the model templated material because of the residual oxygen-containing groups on its surface as sites for intermolecular attractions, and cost-effectiveness. To achieve a uniform particle dispersion and ensure formation of a percolated network, rGO was first ultrasonicated in tetrahydrofuran (THF) for two hours before mixing with the polymer blend solution with 50/50 PS/PVME by weight. Polymer/rGO films were prepared by drop-casting PS/PVME/rGO in THF on silicon wafers, resulting in 15-20 micrometer (μm) thick samples, as determined by analysis of a cross-section scanning electron microscope (SEM) image. The films were vacuum-dried at room temperature (e.g., 23° C.) before being loaded to a rapid thermal processing oven for the freeze-burn procedure under a nitrogen atmosphere.

Figure 2:
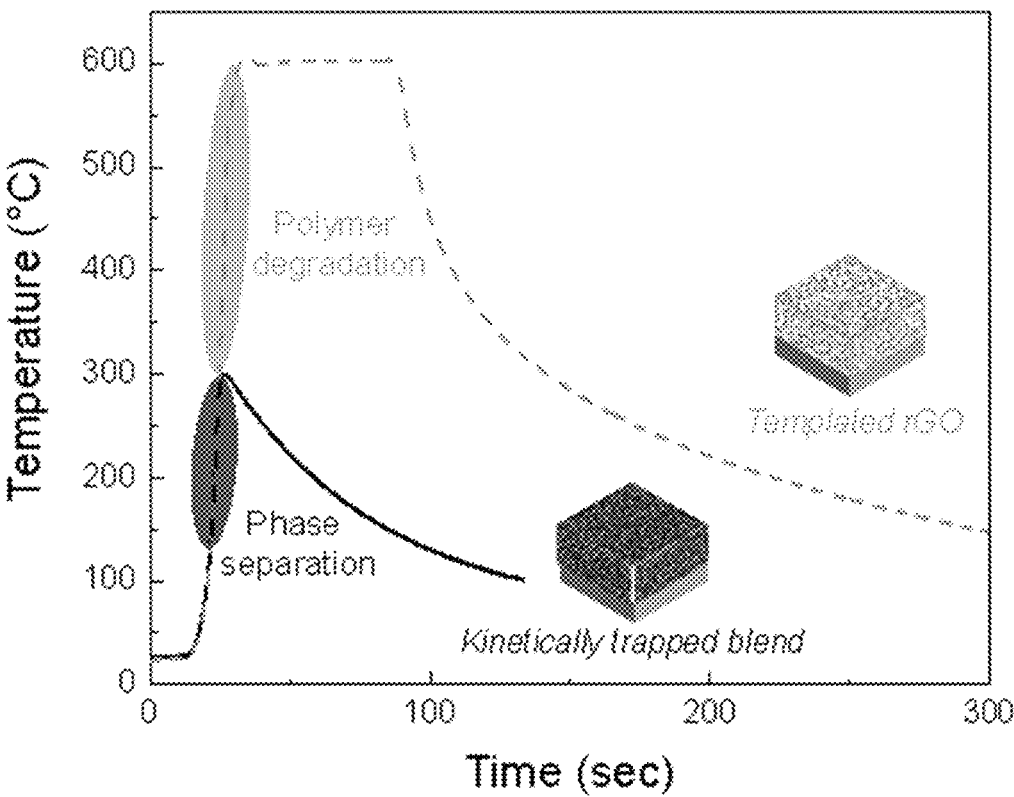
FIG. 2 shows rapid thermal annealing (RTA) profiles as a plot of temperature (° C.) versus time (second, sec), demonstrating the two annealing temperatures (300 and 600° C.) employed in the Examples to kinetically trap the composite structure and template rGO.

The freeze-burn process includes two thermal transitions, namely phase separation (templating) followed by polymer degradation (template removal), as illustrated in FIG. 1. The precursor film starts as a miscible polymer blend loaded with the hard material at room temperature. Thermogravimetric analysis (TGA) of each component was conducted to determine the processing temperature for complete polymer degradation where rGO decomposes minimally. As shown in FIG. 2, rapid heating through RTA induces phase separation to form a kinetically trapped structure with rGO localized in the PVME phase (solid line). Continued heating above 300° C. causes polymer decomposition to attain a templated porous rGO network (dashed line). The sample morphology right before the polymer template removal was also examined by quenching the sample to 300° C. and compared with the resulting templated rGO structure. The entire process requires less than 10 minutes, making freeze-burn an energy- and time-efficient method.

Figure 3:
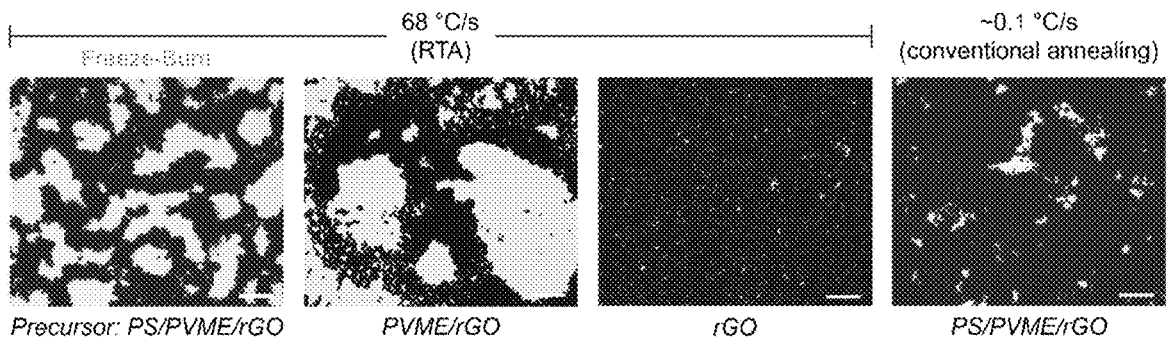
FIG. 3 shows optical images of rGO on Si wafer after RTA (68° C./s) to 600° C. of rGO, PVME/rGO, and PS/PVME/rGO precursor films (3 wt % filler loading), and corresponding morphology of PS/PVME/rGO after conventional annealing (~0.1° C./s) to 600° C. Scale bars represent 50 μm.

To form a controlled porous network, a combination of a rapid heating rate and a polymer blend template with preferential wetting with the filler was needed. FIG. 3 shows the optical images of rGO after RTA (68° C./s) and conventional annealing (~0.1° C./s) to 600° C. of different precursor films. The first three micrographs of FIG. 3 underscore the importance of using a polymer blend since annealing neat rGO did not alter its initial as-cast aggregated structure. Addition of PVME alone, which interacts favorably with rGO, into the precursor film resulted in a non-continuous morphology with hollow circular regions of varying size due to uncontrolled dewetting. In contrast, the PS/PVME/rGO film subjected to RTA led to the formation of continuous rGO across the full dimensions of the substrate. Conventional annealing of the same precursor film (PS/PVME/rGO) at a heating rate of ~0.1° C./s, on the other hand, produced aggregates of rGO, likely due to the significantly longer annealing process that permitted the mobility of different components (FIG. 3, far right image). These control experiments indicate that the rapid rates accessible via RTA facilitate kinetic trapping of a co-continuous structure and minimize the overall processing time.

Figure 4:
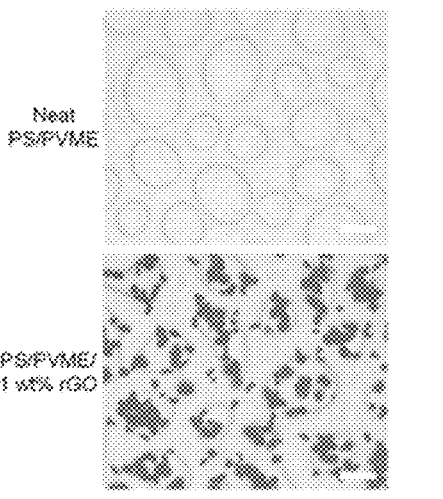
FIG. 4 shows optical images of PS/PVME and PS/PVME/rGO (1 wt % rGO loading) on Si wafer after RTA (68° C./s) to 300° C., depicting the localization of rGO within PVME (brighter phase). Scale bars are 20 μm.
Figure 5:
FIG. 5 shows fluorescence (left) and transmitted differential interference contrast (right) images of PS/PVME and PS/PVME/rGO (1 wt % loading) with anthracene-labeled PS on quartz after RTA (68° C./s) to 300° C., displaying the aggregation of rGO within the non-fluorescent PVME. Scale bars are 50 μm.
Figure 6:
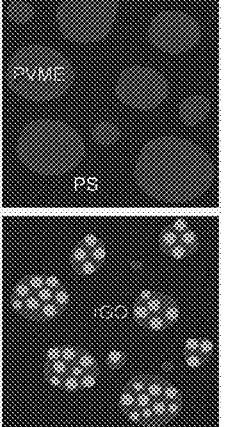
FIG. 6 is a schematic illustration showing the preferential segregation of rGO within PVME.

RTA to 300° C. was conducted to investigate the location of rGO in the polymer blend composite before polymer degradation, as shown in FIG. 4. The neat blend shows a typical droplet-matrix morphology as a result of nucleation and growth where the brighter droplet phase represents PVME having a lower refractive index compared to PS. For the 1 wt % rGO-loaded sample, rGO preferentially segregated into the PVME phase with higher dispersive solubility parameter. Without wishing to be bound by theory, this localization is potentially due to hydrogen bonding between the hydroxyl groups of rGO and oxygen atoms of PVME. This observation was also confirmed by laser confocal microscopy of the composite film with anthracene-labeled PS (1 wt % with respect to unlabeled PS) on quartz as displayed in FIG. 5. The obtained fluorescence from PS phase complemented the non-fluorescent droplet phase surrounding rGO in the transmitted differential interference contrast image. The schematic illustration in FIG. 6 highlights the localization of rGO within the PVME phase based on these observations.

Figure 7:
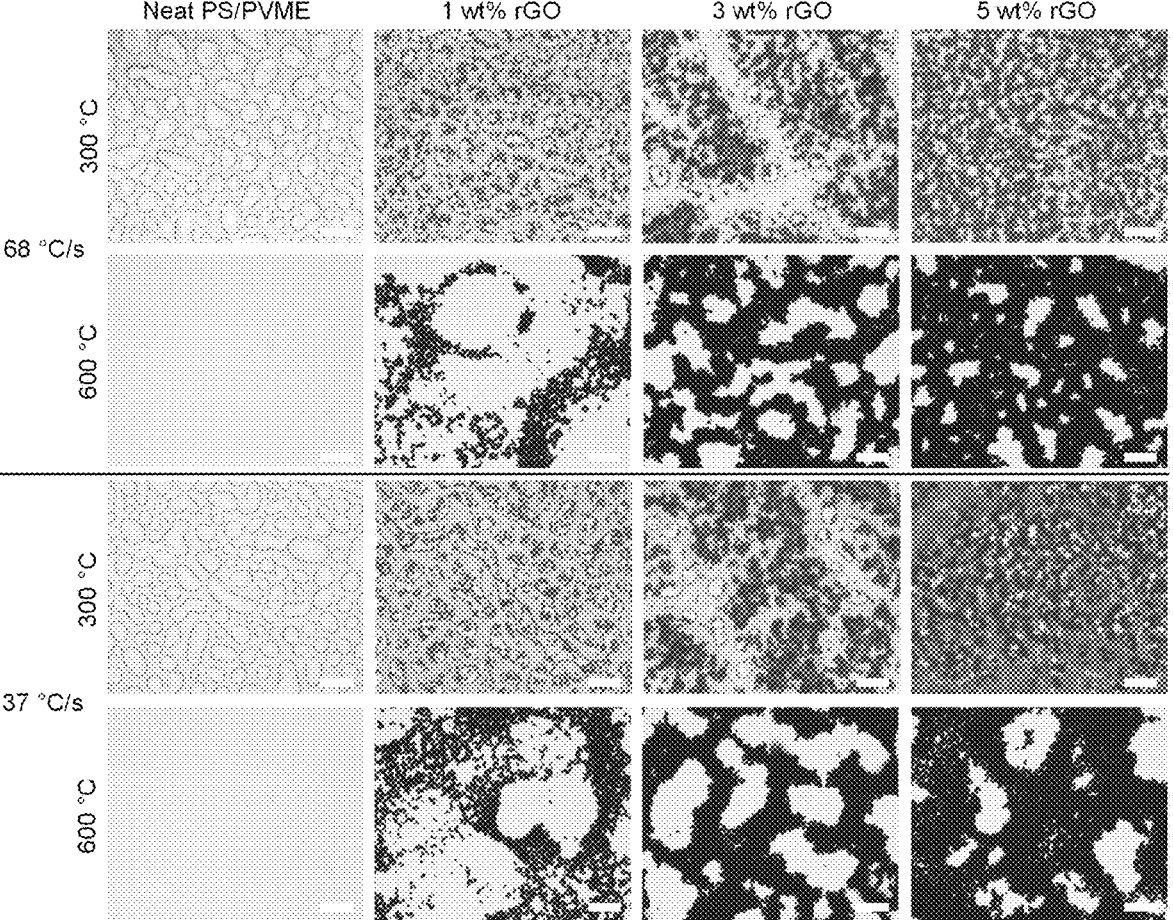
FIG. 7 shows optical images of PS/PVME with varying amounts of rGO on Si wafer after RTA to 300 and 600° C.

The (1) loading of rGO and (2) heating rate were further explored as factors influencing the templating polymer mobility, and in turn, the final rGO morphology. Upon increase in rGO concentrations to 3 and 5 wt %, fewer droplets were observed, which appeared to be more saturated with the dark rGO particles that progressively approached a percolated structure, as shown in FIG. 7. These observations indicate that beyond a particular rGO loading, structural coarsening is precluded, which would otherwise produce large, dispersed droplets to minimize the interfacial energy. In other words, rGO arrests phase separation and entraps the co-continuous structure.

The morphological correspondence between the kinetically trapped intermediate film and templated rGO network obtained after RTA to 600° C. was probed, as exhibited in FIG. 7. Both rGO loading and RTA ramp rate were varied to tailor the degree of kinetic trapping. A hold or "soak" time of 60 seconds was employed to ensure complete template degradation, as confirmed by thermogravimetric analysis. No polymer was present after annealing the neat blend to 600° C. However, employing different amounts of rGO led to a striking difference in the outcome of the freeze-burn process. The lowest rGO loading (1 wt %) resulted in a non-uniform morphology dominated by hollow circular regions (as shown in FIG. 8) that are larger than the intermediate droplets, suggesting that droplets coalesced before template degradation. Performing freeze-burn on composite films containing 3 wt % rGO yielded a continuous morphology across the substrate, indicating that spinodal decomposition is the dominant phase separation mechanism and implying that the percolation threshold had been reached. Although a small number of droplets were present at 300° C., no circular bare regions were visible after template removal. The rGO cluster also appeared to be wider compared to the intermediate dimension before polymer degradation. Upon increasing the rGO concentration to 5 wt %, stacked, continuous layers of rGO with an abundance of smaller macropores were generated. An even denser network with thicker features was obtained for 7 wt % loading, as depicted in FIG. 9. It was noted that pushing the rGO loading beyond 5 wt % curtailed the dispersibility of the drop-casting mixture. Decreasing the ramp rate to 37° C./s provided more time for phase separation, causing phase coarsening (evident at 0 and 1 wt % rGO loading) and leading to larger pores. Similar trends were observed for other polymer blend compositions (3:7 and 7:3 PS/PVME), as shown in FIG. 10.

Freeze-burned rGO possesses a multi-modal distribution of meso- (2 to 50 nm) and macropores (>50 nm), as visualized in the scanning electron micrographs in FIGS. 11 (*a*) and (*b*). The macropores were formed through spinodal decomposition induced by RTA while the mesopores were inherent to the individual wrinkled particle morphology. The 3D structure of freeze-burned rGO was also probed by z-stacking of confocal images as depicted in FIG. 11(*c*). The macropore area fraction was measured via thresholding of the optical images, as illustrated in FIGS. 11 (*d*) and (*e*). The corresponding value for neat rGO (100 wt % loading) was only about 1% (FIG. 11(*f*) since no templating was expected. In contrast, upon freeze-burning at 37° C./s and 3 wt % loading, a considerable increase in the pore area to 46% was attained. A less pronounced increase to 27% was quantified for 5 wt % loading at the same ramp rate due to greater kinetic trapping and higher population of particles. The pore area corresponding to 1 wt % rGO is not presented here since the obtained structure is not continuous as discussed above. Furthermore, increasing the heating rate to 68° C./s barely influenced the pore area increase, suggesting that particle loading plays a greater role in tuning polymer mobility (detailed later) that affects macropore formation.

The mesoporous structure observed by SEM can be quantitatively characterized by nitrogen gas adsorption measurements. The adsorption-desorption isotherms of freeze-burned samples and neat rGO showed a large amount of adsorption and distinct hysteresis at higher relative pressures that are characteristic features of type IV curves (typically given by mesoporous molecular sieves and industrial adsorbents), confirming large numbers of mesopores. Freeze-burned rGO particularly prepared at high rGO loading gave high specific surface area similar to neat rGO, as plotted in FIG. 12. The result confirms that the freeze-burn method can retain the high surface area of nanomaterials. A wide hysteresis loop in the isotherms classified as type H2 indicates complex pore structure affected by network effects, which agrees with the structure probed via SEM. The pore size distributions were obtained by grand canonical Monte Carlo (GCMC) simulation method using the adsorption isotherms, and the corresponding differential average distributions are shown in FIG. 13 to emphasize smaller pores. Freeze-burned samples largely lost micropores of neat rGO that are smaller than 1 nm, which is likely due to pore blockage by thermal degradation products. Nonetheless, several large peaks were observed at the scale of 1-100 nm and total pore volumes ranged from 0.85 to 1.12 $cm^3/g$. The multi-modal distribution of freeze-burned rGO is similar to that of neat rGO and consistent with the complex nanoporous morphology indicated by SEM images and type H2 hysteresis. Freeze-burn proved be to be effective at constructing multi-scale porous structures and maintaining the original morphology of the nanomaterial.

Without wishing to be bound by theory, it was hypothesized that the resultant macropore area relevant to the scale of phase separation is dictated by polymer mobility. To test this hypothesis, the glass transition temperatures ($T_g$) of PS and PVME with varying rGO loadings were measured by differential scanning calorimetry. Bulk samples at different heating rates (5, 10, 20, and 30° C./min) were characterized, and an increase in $T_g$ of both polymers was observed with an increase in heating rate as expected. The extrapolated $T_g$ of PS increased only by 2° C. upon loading with 5 wt % rGO while the $T_g$ of PVME increased by 30° C. at the same rGO concentration. This larger increase in the $T_g$ of PVME corroborates the preferential segregation of rGO within the PVME phase depicted in FIG. 4-6, thereby diminishing its molecular mobility more substantially. The observed trend of $T_g$ against particle loading agrees well with the Fox equation, displayed as broken lines in FIG. 14(a). Based on the $T_g$ data, the mobility of PVME was estimated represented by its diffusion coefficient (D) using the degradation temperature ($T_{deg}$): $\log(D) \sim 1/(T_{deg} - T_g)$, assuming that the activation energy for diffusion is constant with rGO loading and that $T_{deg}$ is equal to 300° C., the onset of degradation from TGA. FIG. 14(b) shows a good correlation between the macropore area and the approximated mobility, indicating that a higher mobility gives rise to a larger macropore area. It should be noted that the observed qualitative trend does not change with the selection of $T_{deg}$ values from onset to endset degradation temperatures of PVME. Evidently, the impact of rGO loading on pore area (reduction by 19% from 3 to 5 wt % loading) is greater than that of annealing rate (decline by only 3% from 37 to 68° C./s). These findings demonstrate that the influence of composition and processing parameter on the resulting morphology can be captured by a single thermophysical parameter, $T_g$, which is easily measurable.

Example 2: Carbon Black, CNP, MWCNT, GO, C₆₀

To examine the universality of freeze-burn, PS/PVME films filled with 5 wt % carbon black, carbon nanopowder (CNP), multi-walled carbon nanotube (MWCNT), graphene oxide (GO), and buckminsterfullerene ($C_{60}$) were prepared and subjected to RTA to 600° C. at a ramp rate of 68° C./s, similar to rGO processing conditions. Among these materials, all but $C_{60}$ were successfully templated. FIG. 15 shows the resulting freeze-burned morphologies that have been templated by the polymer blend, as opposed to neat fillers (i.e., no template) with aggregated morphologies, as shown in FIG. 16. The final network morphology is unique to each carbon-based additive. Without wishing to be bound by theory, it is speculated that this arises from the individual filler size and morphology, which impact the elastic force balance condition during phase separation. In fact, it was found that similar morphologies of the rGO and carbon black network structures as we expect little to no elastic force contribution when freeze-burning these materials with comparable particulate features. CNP also resulted in a network structure, below which an abundance of particles was observed covering the substrate, likely due to its smaller size and faster diffusion. In contrast, a web-like morphology was obtained for fibrous MWCNT and sheet-like GO potentially because of the elastic force during phase separation evidenced by thinning of connection points. Fluorescence imaging of these composite films with anthracene-labeled PS revealed that carbon black, CNP, and MWCNT similarly localized within the PVME phase while GO was observed at the PS/PVME interface.

Example 3: Molybdenum Disulfide

PS/PVME in a mass ratio of 1:1 was used with molybdenum disulfide ($MoS_2$) in the freeze-burn process to create porous inorganic networks. Films were prepared with a $MoS_2$ loading of 5 weight percent with respect to the polymer. The films were subjected to RTA using a hold temperature of 600° C. for 60 seconds with a ramp rate of 68° C./s, similar to the processing conditions described above for Examples 1 and 2. FIG. 17 shows the resulting freeze-burned morphologies that have been templated by the polymer blend.

In summary, the present inventors have introduced freeze-burn as a robust and rapid approach to fabricate porous carbon networks via sequential templating and template removal induced by RTA. In a PS/PVME/rGO model system, particle loading and annealing ramp rate were found to affect the arresting of phase-separated structures, achieving a percolated network. The macroscopic pore formation varied with these processing variables using a single parameter, polymer mobility. The intrinsic mesopore size distribution as well as specific surface area of resultant templated structures were found not to be substantially deteriorated by freeze-burn. The method presented herein can be generalized to other carbon-based materials such as carbon black, carbon nanopowder, MWCNT, and GO as well as inorganic-based materials such as molybdenum disulfide, without changing the template composition and processing conditions. A range of particle chemistry beyond the carbon and inorganic materials exemplified here and selection of other template configurations such as other block copolymers is encompassed by the method of the present disclosure. RTA will benefit the large-scale fabrication of porous structures with its reduced overall process time, minimized thermal budget, and optimized productivity/cost ratio. A significant improvement is therefore provided by the present disclosure.

Experimental details follow.

Materials. Polystyrene (PS, Mw 125-250 kDa, Mfr. No. 4453709), tetrahydrofuran (THF, 99%, stabilized), and carbon black (acetylene, 100% compressed, 99.9+%, Prod. No. 45527) were purchased from Alfa Aesar (Haverhill, MA, USA). Poly(vinyl methyl ether) (PVME, 50% aqueous solution, Mw 90 kDa, Cat. No. 0303-500) was obtained from Polysciences Inc. (Warrington, PA, USA), and was freeze-dried for two days prior to use to remove water. α-(Anthracen-9-yl)-terminated PS (Prod. No. P19687-S-An) was acquired from Polymer Source, Inc (Quebec, Canada). Reduced graphene oxide (rGO) and graphene oxide (GO) powder were purchased from Graphenea (San Sebastián, Spain). Multi-walled carbon nanotube (MWCNT, Prod. No. 698849), carbon nanopowder (CNP, Prod. No. 633100), and buckminsterfullerene (C60, 99.5%, Prod. No. 379646) were obtained from Sigma-Aldrich (St. Louis, MO, USA). Silicon wafers (Item No. 452, 500 mm thick, single-side polished) and polished quartz (1/16 in thick) were procured from UniversityWafer, Inc. (Boston, MA, USA) and Chemglass Life Sciences LLC (Vineland, NJ, USA), respectively, and were cut into 1 cm×1 cm pieces.

Composite Film Preparation: PS/PVME/rGO. PS and PVME (with mass ratios of 1:1, 3:7, and 7:3) were initially dissolved in THF, filtered through a polytetrafluoroethylene membrane (0.2 μm VWR), and vortexed at 450 rpm for 30 min. Before incorporating rGO into the system, it was dispersed in THF by ultrasonication in a Fisherbrand CPX3800 ultrasonic bath (kept at a temperature below 23° C.) for 2 hours. The two mixtures were then combined, achieving a total polymer concentration of 4 w/v % (with respect to the solvent volume) and variable rGO loading (0, 1, 3, and 5 wt % with respect to the total polymer content). The silicon wafers and quartz substrates were cleaned by washing with mucasol detergent solution, deionized water (twice), acetone, and isopropanol for 10 minutes each in a benchtop sonication bath, then dried in an oven set at 120° C. for at least an hour and subjected to 15 min of UV-ozone treatment with a UVO-Cleaner® Model 18 (Jelight Company, Inc.). Composite films were prepared by drop casting ~80 μL of THF mixtures on clean substrates, followed by vacuum drying at room temperature (~23° C.) for at least 18 hours. Neat polymer blend and rGO samples were also prepared for comparison. A similar procedure was performed for preparing other carbon-based films.

Composite Film Preparation: PS/PVME/MoS$_2$. PS and PVME with a mass ratio of 1:1 were initially dissolved in THF, filtered through a polytetrafluoroethylene membrane (0.2 pm VWR), and vortexed at 450 rpm for 30 min. Before incorporating MoS$_2$ into the system, it was dispersed in THF by ultrasonication in a Fisherbrand CPX3800 ultrasonic bath (kept at a temperature below 23° C.) for 2 hours. The two mixtures were then combined, achieving a total polymer concentration of 4 w/v % (with respect to the solvent volume) and a MoS$_2$ loading of 5 wt % (with respect to the total polymer content). Composite films were prepared by drop casting ~80 μL of THF mixtures on clean silicon substrates, followed by vacuum drying at room temperature (~23° C.) for at least 18 hours.

Rapid Thermal Annealing. RTA was performed on a Solaris 100 rapid thermal processing system at two different soaking temperatures in a nitrogen atmosphere (flow rate: 10 standard liters per minute). The first hold temperature was at 600° C. for 60 s with varying ramp rates (37 and 68° C./s as plotted in Figure S2b). The second one was employed at 300° C. (below T$_{deg,polymer}$) for 1 s with similar ramp. Similarly, conventional tube furnace annealing was conducted at 600° C. for 10 minutes with a ramp rate of ~0.1° C./s in nitrogen atmosphere for comparison.

Microscopic Imaging. All samples were imaged by optical microscopy using a ZEISS Axioscope 5 microscope with Axiocam 305 color camera. Analysis of the optical images was carried out using ImageJ to measure the macropore area fraction. Freeze-burned samples were also imaged by scanning electron microscopy (SEM) using an FEI Magellan 400 XHR scanning electron microscope operating at 1.00 kV and 13 pA. Laser confocal microscopy imaging experiments were performed using a Nikon TiE stand with an A1RHD resonant confocal microscope (Nikon Instruments Inc., Melville, NY, US) equipped with DIC optics to visualize filler localization. The samples prepared on quartz were imaged using simultaneous DIC and green fluorescence imaging at a scan size of 1024 by 1024 pixels. The DIC images were produced via standard DIC optics and were detected at the transmitted detector while fluorescence was detected at the GaAsP detector after being filtered through a 525/50 nm green bandpass filter. All images were acquired using a Nikon 10× objective and samples were mounted on a glass coverslip. Similar imaging via reflective mode using a Nikon A1R MP multi-photon confocal microscope equipped with a Nikon 20× objective was conducted on freeze-burned rGO prepared on Si wafer to obtain its 3D structure by z-stacking.

Gas Adsorption Measurements. Nanopore structures were characterized by nitrogen gas adsorption measurement using a MicrotracBEL BELSORP-MAX gas adsorption analyzer at −196° C. Powders of carbon samples were collected from silicon wafers and transferred to an aluminum DSC pan to readily handle fine powders and ensure weight precision in small amount (1 mg). The pans were transferred into a glass tube and thoroughly evacuated at 250° C. in vacuum (a day by a rotary pump and additional six hours by a turbomolecular pump) prior to measurements. Specific surface area was analyzed by Brunauer—Emmett—Teller (BET) method at the relative pressures of 0.1 to 0.3. Pore size distributions were calculated by grand canonical Monte Carlo (GCMC) molecular simulations using the obtained nitrogen adsorption isotherms. Simulations were performed on a MicrotracBEL BELMaster software using a provided kernel assuming slit pore and graphitic carbon surface. Simulation results were verified by reproduction of the isotherms that reasonably agreed with the experimental ones. At least three experiments were performed by using different specimens of each sample and the averaged results were described with error bars representing the minimum and maximum values.

Thermal Characterization. Thermogravimetric analysis (TGA) was performed on a TA Instruments Q500 thermogravimetric analyzer under nitrogen atmosphere. The temperature was swept from 20° C. to 800° C. at a ramp rate of 20° C./min. Differential scanning calorimetry (DSC) was carried out on a TA Instruments Q200 differential scanning calorimeter equipped with RCS90 refrigerated cooling system at a temperature range from −50 to 160° C. The samples were heated to 160° C. at varying ramp rates of 5, 10, 20, 30° C./min, and cooled back to −50° C. at a rate of 10° C./min The maximum and minimum temperatures were held for 5 minutes each. The midpoint glass transition temperatures were determined from the heating cycles (following a preliminary cycle to remove the thermal history of the material) using the TA Universal Analysis software.

This disclosure further encompasses the following aspects.

Aspect 1: A method of making a porous structure, the method comprising: combining a hard material comprising a carbonaceous material, an inorganic material, or a combination thereof, with a polymer blend to provide a mixture; and heating the mixture to a temperature effective to template the hard material, degrade the polymer blend and provide the porous structure comprising the hard material.

Aspect 2: The method of aspect 1, wherein combining the hard material with the polymer blend comprises forming a suspension comprising the polymer blend, the hard material, and a solvent, and the method further comprises removing the solvent from the mixture prior to heating the mixture to a temperature effective to template the hard material and degrade the polymer blend.

Aspect 3: The method of aspect 1 or 2, wherein the hard material comprises the carbonaceous material.

Aspect 4: The method of any of aspects 1 to 3, wherein the carbonaceous material comprises reduced graphene oxide, graphene oxide, carbon black, carbon nanopowder, carbon nanotubes, fullerene, or a combination thereof.

Aspect 5: The method of aspect 1 or 2, wherein the hard material comprises the inorganic material, preferably wherein the inorganic material comprises metal nanoparticles, metal oxide nanoparticles, metal sulfide nanoparticles, metal nitride nanoparticles, metal carbide nanoparticles, metallic glasses, or a combination thereof.

Aspect 6: The method of any of aspects 1 to 5, wherein the polymer blend comprises a first polymer and a second polymer, and wherein the polymer blend exhibits phase separation between the first polymer and the second polymer at at least one temperature in the range of 25° C. to 500° C.

Aspect 7: The method of aspect 6, wherein the polymer blend exhibits phase separation between the first polymer and the second polymer at a temperature greater than 100° C., or greater than 200° C.

Aspect 8: The method of any of aspects 1 to 7, wherein the polymer blend comprises a polystyrene, poly(vinyl methyl ether), poly(methyl methacrylate), a styrene-acrylonitrile copolymer, an acrylonitrile-butadiene copolymer, or a combination thereof.

Aspect 9: The method of any of aspects 1 to 8, wherein the polymer blend comprises poly styrene and poly(vinyl methyl ether); or poly(methyl methacrylate) and a styrene-acrylonitrile copolymer; or a styrene-acrylonitrile copolymer and an acrylonitrile-butadiene copolymer.

Aspect 10: The method of any of aspects 1 to 9, wherein the polymer blend comprises a first polymer and a second polymer present in a weight ratio of first polymer:second polymer of 1:9 to 9:1, or 2:8 to 8:2, or 3:7 to 7:3, or 4:6 to 6:4, or 4.5:5.5 to 5.5:4.5, or 5:5.

Aspect 11: The method of any of aspects 1 to 10, wherein the temperature effective to degrade the polymer blend is greater than 250° C., or greater than 300° C., or 250 to 1000° C., or 300 to 750° C., or 300 to 650° C.

Aspect 12: The method of any of aspects 1 to 11, the method further comprising maintaining the mixture at the temperature effective to degrade the polymer blend for a time sufficient to degrade the polymer blend, preferably for 30 seconds to 5 minutes, or 30 seconds to 2 minutes, or 45 seconds to 1.5 minutes.

Aspect 13: The method of any of aspects 1 to 12, wherein the mixture comprises the hard material in an amount of greater than 0 to 10 weight percent, or greater than 0 to 7 weight percent, or greater than 0 to 6 weight percent, or 1 to 6 weight percent, or 2 to 5 weight percent.

Aspect 14: The method of any of aspects 1 to 13, wherein heating the mixture is at a rate of 20 to 150° C./s, or 20 to 100° C./s, or 20 to 80° C./s, or 30 to 70° C./s, or 35 to 65° C./s.

Aspect 15: The method of any of aspects 1 to 14, wherein the porous structure is devoid of the polymer blend.

Aspect 16: The method of any of aspects 1 to 15, wherein the porous structure comprises mesopores having an average diameter of 2 to 50 nanometers and macropores having an average diameter of greater than 50 nanometers.

Aspect 17: The method of any of aspects 1 to 16, wherein the porous structure has a macropore area of greater than 10%, or 15 to 50%, or 20 to 50%.

Aspect 18: The method of any of aspects 1 to 17, wherein the porous structure has one or both of an average pore volume of 0.5 to 1.5 cm$^3$/g, or 0.75 to 1.2 cm$^3$/g, or 0.85 to 1.15 cm$^3$/g, and a specific surface area of greater than 75 m$^2$/g, or greater than 100 m$^2$/g, or greater than 150 m$^2$/g.

Aspect 19: A porous structure made by the method of any of aspects 1 to 18.

Aspect 20: A porous structure comprising a solid continuous phase, and a gaseous dispersed phase, wherein the solid continuous phase comprises a hard material comprising a carbonaceous material, an inorganic material, or a combination thereof; wherein the porous structure comprises mesopores having an average diameter of 2 to 50 nanometers and macropores having an average diameter of greater than 50 nanometers; wherein the porous structure has a macropore area of greater than 10%, or 15 to 50%, or 20 to 50%; and optionally, wherein the porous structure has one or both of: an average pore volume of 0.5 to 1.5 cm$^3$/g, or 0.75 to 1.2 cm$^3$/g, or 0.85 to 1.15 cm$^3$/g, and a specific surface area of greater than 75 m$^2$/g, or greater than 100 m$^2$/g, or greater than 150 m$^2$/g.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a porous structure, the method comprising:

combining a hard material comprising
    a carbonaceous material,
    an inorganic material, or
    a combination thereof,
with a polymer blend to provide a mixture; and heating the mixture to a temperature effective to template the hard material, degrade the polymer blend and provide the porous structure comprising the hard material;

wherein the method does not comprise a freeze-drying step.

2. The method of claim 1, wherein combining the hard material with the polymer blend comprises forming a suspension comprising the polymer blend, the hard material, and a solvent, and the method further comprises removing the solvent from the mixture prior to heating the mixture to a temperature effective to template the hard material and degrade the polymer blend.

3. The method of claim 1, wherein the hard material comprises the carbonaceous material.

4. The method of claim 1, wherein the carbonaceous material comprises reduced graphene oxide, graphene oxide, carbon black, carbon nanopowder, carbon nanotubes, fullerene, or a combination thereof.

5. The method of claim 1, wherein the hard material comprises the inorganic material.

6. The method of claim 1, wherein the polymer blend comprises a first polymer and a second polymer, and wherein the polymer blend exhibits phase separation between the first polymer and the second polymer at at least one temperature in the range of 25° C. to 500° C.

7. The method of claim 6, wherein the polymer blend exhibits phase separation between the first polymer and the second polymer at a temperature greater than 100° C. to 500° C.

8. The method of claim 1, wherein the polymer blend comprises a polystyrene, poly(vinyl methyl ether), poly (methyl methacrylate), a styrene-acrylonitrile copolymer, an acrylonitrile-butadiene copolymer, or a combination thereof.

9. The method of claim 1, wherein the polymer blend comprises poly styrene and poly(vinyl methyl ether); or poly(methyl methacrylate) and a styrene-acrylonitrile copolymer; or a styrene-acrylonitrile copolymer and an acrylonitrile-butadiene copolymer.

10. The method of claim 1, wherein the polymer blend comprises a first polymer and a second polymer present in a weight ratio of first polymer: second polymer of 1:9 to 9:1.

11. The method of claim 1, wherein the temperature effective to degrade the polymer blend is greater than 250° C.

12. The method of claim 1, further comprising maintaining the mixture at the temperature effective to degrade the polymer blend for a time sufficient to degrade the polymer blend.

13. The method of claim 1, wherein the mixture comprises the hard material in an amount of greater than 0 to 10 weight percent, based on the total weight of the polymer blend.

14. The method of claim 1, wherein heating the mixture is at a rate of 20 to 150° C./s.

15. The method of claim 1, wherein the porous structure is devoid of the polymer blend.

16. The method of claim 1, wherein the porous structure comprises mesopores having an average diameter of 2 to 50 nanometers and macropores having an average diameter of greater than 50 nanometers.

17. The method of claim 1, wherein the porous structure has a macropore area of greater than 10%.

18. The method of claim 1, wherein the porous structure has one or both of an average pore volume of 0.5 to 1.5 $cm^3$/g, and a specific surface area of greater than 75 $m^2$/g.

19. A porous structure comprising a solid continuous phase, and a gaseous dispersed phase, wherein the solid continuous phase comprises a hard material comprising
        a carbonaceous material,
        an inorganic material, or
        a combination thereof;

wherein the porous structure comprises mesopores having an average diameter of 2 to 50 nanometers and macropores having an average diameter of greater than 50 nanometers;

wherein the porous structure has a macropore area of greater than 10%; and optionally, wherein the porous structure has one or both of:
        an average pore volume of 0.5 to 1.5 $cm^3$/g, and
        a specific surface area of greater than 75 $m^2$/g.

\* \* \* \* \*